US011614356B2

(12) United States Patent
Ahmad et al.

(10) Patent No.: US 11,614,356 B2
(45) Date of Patent: *Mar. 28, 2023

(54) VERTICAL TANK OIL-GAS-WATER SEPARATION WITH CALIBRATION SYSTEM

(71) Applicant: KING FAHD UNIVERSITY OF PETROLEUM AND MINERALS, Dhahran (SA)

(72) Inventors: Aftab Ahmad, Dhahran (SA); Luai M. Alhems, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 35 days.

This patent is subject to a terminal disclaimer.

(21) Appl. No.: 17/401,437

(22) Filed: Aug. 13, 2021

(65) Prior Publication Data
US 2021/0389167 A1 Dec. 16, 2021

Related U.S. Application Data

(63) Continuation of application No. 16/592,863, filed on Oct. 4, 2019, now Pat. No. 11,112,294.

(51) Int. Cl.
*G01F 25/10* (2022.01)
*G01F 1/74* (2006.01)

(52) U.S. Cl.
CPC ............... *G01F 25/10* (2022.01); *G01F 1/74* (2013.01)

(58) Field of Classification Search
CPC ........................................................ G01F 25/10
USPC .............................................................. 73/1.16
See application file for complete search history.

(56) References Cited

U.S. PATENT DOCUMENTS

| 11,112,294 B2* | 9/2021 | Ahmad ............... G01F 25/10 |
| 2009/0199653 A1 | 8/2009 | Kitami et al. |
| 2011/0114387 A1 | 5/2011 | Belcher et al. |
| 2015/0135797 A1 | 5/2015 | Romero et al. |

(Continued)

FOREIGN PATENT DOCUMENTS

JP 2005-3532 A 1/2005

*Primary Examiner* — Walter L Lindsay Jr.
*Assistant Examiner* — Philip T Fadul
(74) *Attorney, Agent, or Firm* — Oblon, McClelland, Maier & Neustadt, L.L.P.

(57) ABSTRACT

A multiphase flow calibration semi-closed loop system includes an oil-gas-water separation unit, a multiphase flow calibration unit, a single phase flow calibration section, a gas flow section, a flow data acquisition unit, and a programmable logic controller (PLC). The system is designed to have a two-step calibration process. In a first step, single phase water flow meters and single phase oil flow meters of the system are calibrated independently. In a second step, multiphase flow meters or multiphase water cut meters are calibrated using the pre-calibrated water flow meter, pre-calibrated oil flow meter, and the pre-calibrated gas flow meter. In doing so, the oil-gas-water separation unit, the multiphase flow calibration unit, the single phase flow calibration section, and the gas flow section communicate with the flow data acquisition unit providing real time data. Thus, the PLC connected to the flow data acquisition unit can perform the required calibration processes.

8 Claims, 3 Drawing Sheets

(56) References Cited

U.S. PATENT DOCUMENTS

2016/0298992 A1 10/2016 Pathier et al.
2017/0284853 A1 10/2017 Ahmad et al.

* cited by examiner

VERTICAL TANK OIL-GAS-WATER SEPARATION WITH CALIBRATION SYSTEM

CROSS-REFERENCE TO RELATED APPLICATIONS

The present application is a Continuation of U.S. application Ser. No. 16/592,863, now allowed, having a filing date of Oct. 4, 2019.

BACKGROUND

Field of the Invention

The present disclosure relates to a multiphase flow meter calibration system, method and apparatus. In particular, the system, method and apparatus of the present disclosure can be used for oil-gas-water flow meter calibration and water cut meter calibration. In addition to being used for three phase flow meter calibration, the system, method and apparatus of the present disclosure, which may be a semi-closed loop system, can also be independently used for single phase flow meter calibration and two phase flow meter calibration.

Description of the Related Art

In the petroleum industry, accurately measuring the fluid mixture flow rate in crude oil is a challenge. Due to the complex nature of crude oil, measuring the fluid mixture flow rate of a multiphase fluid is particularly difficult. With conventional two phase measurement methods, each phase of the fluid mixture, which is oil and water in this instance, need to be separated and such separation methods cause interruptions in continuous industrial processes.

Generally, when measuring the water content in multiphase fluid mixtures, phase fraction measurement devices and phase velocity measurement devices are used. A Venturi meter is also used to measure the flow rate of the fluid mixture, wherein measuring the flow rate of the fluid mixture requires having an accurate measurement of the fluid mixture density as an input parameter.

Within the oil and gas industry, an increased interest in studying the flow rate of multiphase fluid mixtures is clearly seen over the past decade. As a result, a number of different types of multiphase flow meters (MPFM) were developed. However, these MPFM's are either expensive or inaccurate. Thus, the desired results are not obtained or the process to obtain the desired results is considerably complex. Moreover, most existing systems are related to the calibration of oil-water flow meters. Thus, a fluid mixture containing a gas component cannot be calibrated. See Aftab Ahmad and Luai M. Alhems. "Multiphase Meter Calibration System and Methods Thereof", Patent ISSUED; U.S. Pat. No. 10,139, 257 B2, 27 Nov. 2018; and Aftab Ahmad and Luai M. Alhems. "Calibration System Including Separation Vessel and Pipeline", Patent Application Publication, Pub. No. US 2019/0049279 A1, 14 Feb. 2019, each incorporated herein by reference in their entirety.

In view of the difficulties and drawbacks of the existing MPFM's, an objective of the system of the present disclosure is to describe a multiphase flow meter calibration system. The system of the present disclosure is simple in design and accurately measures the flow parameters such as the fluid mixture flow rates, water content, and gas volume fractions (GVFs). In contrast to existing calibration systems, the system of the present disclosure can calibrate flow meters that monitor a flow rate of a fluid mixture that contains a gas component.

Since multiphase flow meters are highly sophisticated devices that involve huge investments, the accuracy of these devices are vital in the oil and gas industry. By utilizing the system of the present disclosure, multiphase flow meters and water cut meters can be accurately calibrated with reduced operational complexity. The system of the present disclosure can also be used to calibrate single phase, two phase, and three phase flow meters.

SUMMARY OF THE INVENTION

The system, method and apparatus of the present disclosure include a multiphase flow meter calibration system, method and apparatus that include an oil-gas-water separation unit, a multiphase flow calibration unit, a single phase flow calibration section, a gas flow section, a flow data acquisition unit, and a programmable logic controller (PLC).

The oil-gas-water separation unit, the multiphase flow calibration unit, the single phase flow calibration section, and the gas flow section are in fluid communication with each other through a piping system. The flow data acquisition unit receives feedback from the oil-gas-water separation unit, the multiphase flow calibration unit, the single phase flow calibration section, and the gas flow section.

Based upon the feedback received at the flow data acquisition unit, the PLC operates a plurality of valves, a plurality of pumps, and at least one regulator to control the overall flow rate, and thus perform the calibration process. In order to do so, the flow data acquisition unit is communicably coupled with the PLC.

During the calibration process, the system of the present disclosure utilizes a flow controller to control the variable flow pump flow rates and gas flow control valves based upon the pre-defined water, oil, and gas volumetric flow rates.

The system of the present disclosure can be used for single phase, two phase, and three phase flow meter calibration processes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes a multiphase (oil-gas-water) flow meter calibration system, method and apparatus (hereinafter referred to as "the system"). In particular, the system of the present disclosure can accurately calibrate multiphase flow meters and multiphase water cut meters. The system of the present disclosure can also be used for calibration of single phase, two phase, and three phase flow meters. More specifically, the system of the present disclosure can be used to calibrate single phase flow meters for gas, single phase flow meters for oil, single phase flow meters for water, two phase flow meters for gas and oil, two phase flow meters for oil and water, two phase flow meters for water and gas, three phase flow meters for oil, gas, and water, water cut meters for two phase flows, and water cut meters for three phase flows. The system has a two-step calibration process for different fluid flow rates, water-cuts and gas volume fractions (GVFs). In a first step, the single-phase oil and water flow meters of the system are calibrated separately using a single-phase flow loop section. A second step involves the calibration of the multi-phase flow meter or water-cut meters using the three pre-calibrated system's single phase oil, water, and gas flow meters, wherein the gas flow meter is a factory calibrated gas flow meter.

Figure 1:
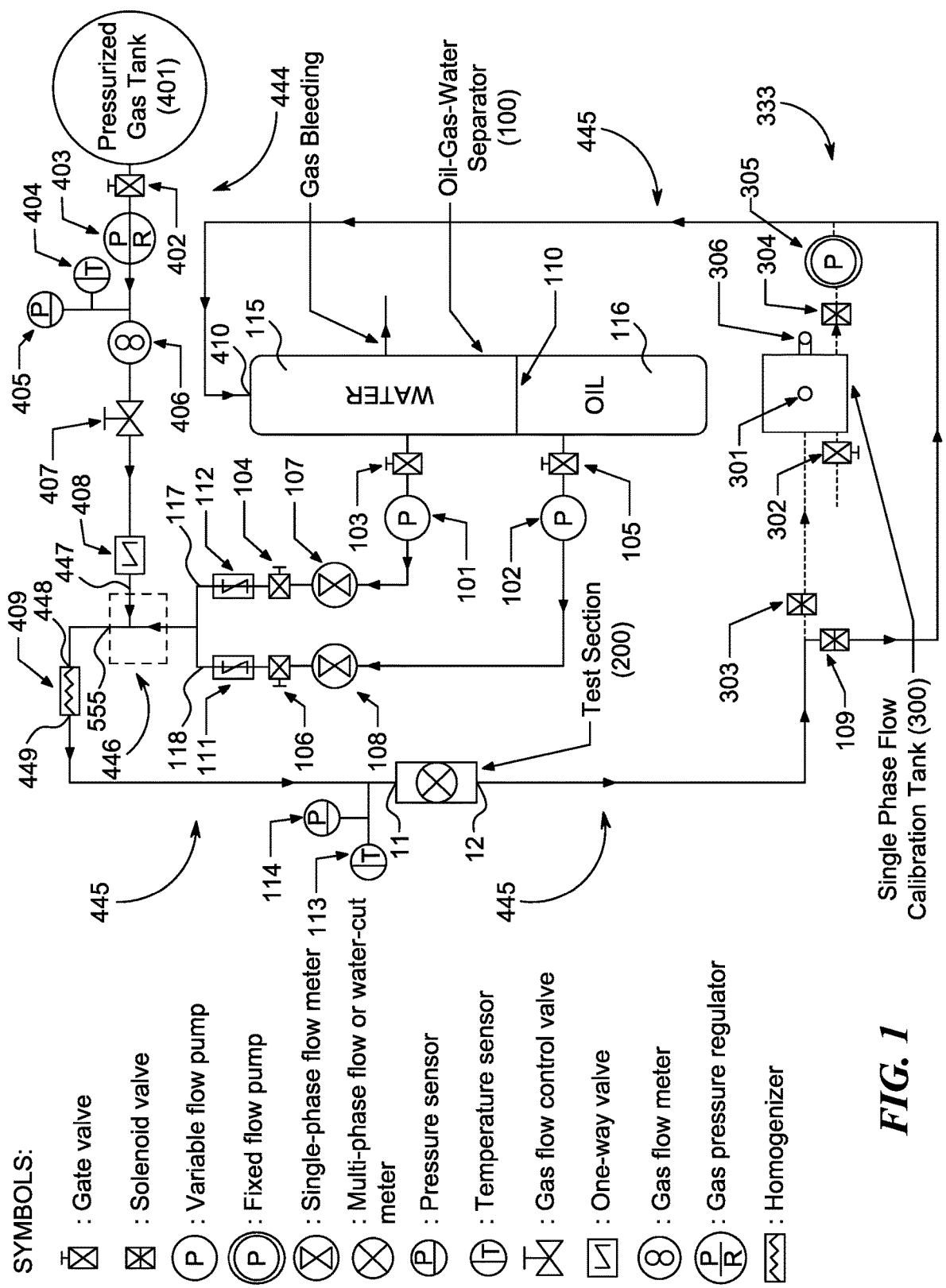
FIG. 1 is a piping and instrumentation diagram of the system of the present disclosure which is being used for multiphase flow meter calibration.
Figure 3:
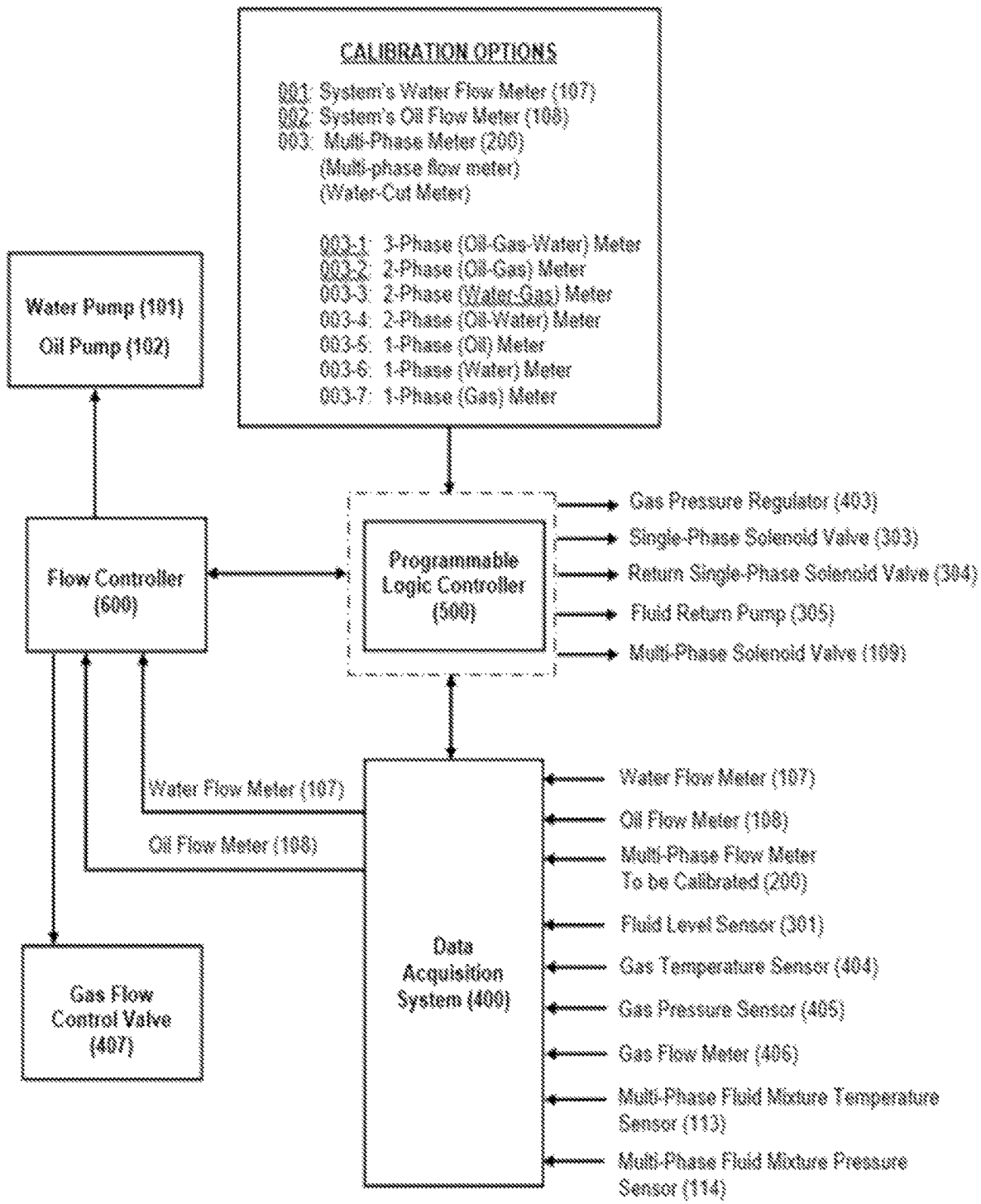
FIG. 3 is an illustration of the connections from the oil-gas-water separation unit, the multiphase flow calibration unit, the single phase flow calibration section, the gas flow section to the flow controller, the flow data acquisition unit, and the programmable logic controller.

As seen in FIG. 1 and FIG. 3, to fulfill the intended functionalities, the system of the present disclosure comprises an oil-gas-water separation unit 100, a multiphase flow calibration unit 200, a single phase flow calibration section 333, a gas flow section 444, a flow data acquisition unit 400, and a programmable logic controller (PLC) 500. For the flow rate measurements the flow meters are preferably one or more of a magnetic flow meter, ultrasonic flow meter, and turbine flowmeter. We preferred turbine flow meters for the disclosed system The oil-gas-water separation unit 100, the multiphase flow calibration unit 200, which is used for testing multiphase flow meters or multiphase water cut meters, and the single phase flow calibration section 333 are in fluid communication with each other through a piping system 445.

A multiphase fluid inlet 410 is in fluid communication with the oil-gas-water separation unit 100 such that a fluid mixture can flow into the oil-gas-water separation unit 100 through the multiphase fluid inlet 410. To draw a water phase from a water section 115 of the oil-gas-water separation unit 100, a single phase water outlet 117 is in fluid communication with the water section 115, preferably through a variable flow water pump 101, and a water flow meter 107. On the other hand, to draw an oil phase from an oil section 116 of the oil-gas-water separation unit 100, a single phase oil outlet 118 is in fluid communication with the oil section 116, preferably through a variable flow oil pump 102, and an oil flow meter 108. Since the single phase water outlet 117 and the single phase oil outlet 118 are independent to each other, the water flow meter 107 and the oil flow meter 108 can be independently calibrated. During multiphase flow calibration, an output from the single phase water outlet 117 and an output from the single phase oil outlet 118 are combined at a phase combination piping joint 446. To do so, the single phase water outlet 117 and the single phase oil outlet 118 are in fluid communication with the phase combination piping joint 446. To provide a gas phase of a fluid mixture, a gas flow outlet 447 is in fluid communication with a pressurized gas tank 401 through a gas pressure regulator 403 and a gas flow meter 406. Similar to the single phase water outlet 117 and the single phase oil outlet 118, the gas flow outlet 447 is also in fluid communication with the phase combination piping joint 446. A downstream homogenizer 409, which comprises a homogenizer inlet 448 and a homogenizer outlet 449, is used for thorough mixing of the fluid mixture. When used for multiphase flowmeter calibration, a piping outlet 450 of the phase combination piping joint 446 is in fluid communication with the homogenizer inlet 448. After mixing, for multiphase flowmeter calibration, the homogenizer outlet 449 is in fluid communication with an inlet 11 of the multiphase calibration unit 200. The fluid mixture that passed through the multiphase calibration process is returned to the oil-gas-water separation unit 100 through an outlet 12 of the multiphase calibration unit 200 which is in fluid communication with the oil-gas-water separation unit 100.

In particular, the multiphase flow calibration unit 200 is installed into a multiphase flow loop for calibration of either a multiphase flow meter or a water cut meter. The multiphase flow calibration unit 200 is a hollow cylinder made of stainless steel with coupling type of piping joints. The gas flow section 444, which controls the gas flow of a mixture that is within the piping system 445, is operatively coupled with the piping system 445 through the phase combination piping joint 446 in between the oil-gas-water separation unit 100 and the multiphase flow calibration unit 200. In order to monitor and record data related to a fluid mixture that is within the piping system 445, the oil-gas-water separation unit 100, the multiphase flow calibration unit 200, the single phase flow calibration section 333, and the gas flow section 444 are communicably coupled with the flow data acquisition unit 400. In particular, the flow data acquisition unit 400 receives a plurality of feedback signals from the oil-gas-water separation unit 100, the multiphase flow calibration unit 200, the single phase flow calibration section 333, and the gas flow section 444 and transfers the plurality of feedback signals to the PLC 500 so that the PLC 500 can control components that can be, but are not limited to, a plurality of pumps, a plurality of valves, and at least one regulator. To do so, as seen in FIG. 3, the flow data acquisition unit 400 is communicably coupled with the PLC 500.

In a preferred embodiment, the oil-gas-water separation unit 100 is a cylindrical horizontal tank divided into the water section 115 and the oil section 116 by a fluid separation weir 110 which is positioned approximately at $\frac{2}{3}^{rd}$ of the diameter/height of the cylindrical horizontal tank. The inlet and outlet of the calibration unit is preferably a coupling for connecting the flow meters to be calibrated. Preferably the oil-gas-water separation tank is oriented to lay on its side such that the water phase is at the bottom and the oil phase passes over a vertical weir and into an oil section. In particular, the fluid separation weir 110 is positioned perpendicular to a lateral wall, wherein the cylindrical horizontal tank is resting on the lateral wall and the fluid separation weir 110 is positioned at a distance which is approximately equivalent to $\frac{2}{3}^{rd}$ of the overall diameter/height of the cylindrical horizontal tank. When a multiphase fluid mixture is used with the system of the present disclosure, the fluid mixture returns to the oil-gas-water separation unit 100 at the water section 115 during the calibration process and separates into distinct phases by moving through a semi-closed loop within the oil-gas-water separation unit 100. A volume of gas within the fluid mixture returning to the oil-gas-water separation unit 100 is released to the atmosphere through a gas bleeding opening in the water section 115. The gas bleeding opening can be in fluid communication with an in-line gas purifier for gas purification purposes. In a different embodiment, a condensation process can be performed for the gas exiting the gas bleeding section. Condensation processes are especially suitable for the cleaning of low flow highly concentrated streams of exhaust gas. The entire waste gas stream is cooled below the dew point of the vapors contained therein so that the gasses can condense on the surface of the heat exchanger (partial condensation). Theoretically, the achievable recovery rates depend only on the initial concentration, the purification temperature and the vapor pressure of the condensable at that temperature. In practice, however, flow velocities, temperature profiles, the geometry of the equipment, etc. play decisive roles, as effects such as mist formation (aerosols), uneven flow in the condensers and uncontrolled ice formation interfere with the process of condensation and prevent an equilibrium concentration from being reached at the low temperatures.

Due to gravity, water remains at the water section 115, whereas the oil, which has a density that is smaller than a density of water, flows over the weir to the oil section 116 of the oil-gas-water separation unit 100. Numerically, the density of oil is within a range of 0.90-0.95 g/cm$^3$ preferably 0.91 grams/cubic centimeter (g/cm$^3$)-0.93 g/cm$^3$ between a temperature range of 10 centigrade (° C.)-30° C., preferably 15° C.-25° C. On the other hand, the density of water is approximately 1.0 g/cm$^3$. However, in a different embodiment, the density of water can be 1.02 g/cm$^3$ or 1.03 g/cm' based upon the salt concentration in the water. Separating oil and water by using gravity is known as gravity separation and is a continuous oil-water separation process. Gravity separation is used in a wide variety of industries, and can be most simply differentiated by the characteristics of the mixture to be separated—principally that of 'wet' i.e. —a suspension versus 'dry'-a mixture of granular product. Often other methods are applied to make the separation faster and more efficient, such as flocculation, coagulation and suction. The most notable advantages of the gravitational methods are their cost effectiveness and in some cases excellent reduction. Gravity separation is an attractive unit operation as it generally has low capital and operating costs, uses few if any chemicals that might cause environmental concerns and the recent development of new equipment enhances the range of separations possible. Preferably, an API separator is used in the system of the present disclosure. The API separator is a gravity separation device designed using Stokes' law principles that define the rise velocity of oil droplets based on their density, size and water properties. The design of the separator is based on the specific gravity difference between the oil and the wastewater because that difference is much smaller than the specific gravity difference between the suspended solids and water. Based on that design criterion, most of the suspended solids will settle to the bottom of the separator as a sediment layer, the oil will rise to top of the separator, and the wastewater will be the middle layer between the oil on top and the solids on the bottom. The API design standards, when correctly applied, make adjustments to the geometry, design and size of the separator beyond simple Stokes Law principles. This includes allowances for water flow entrance and exit turbulence losses as well as other factors. API Specification 421 requires a minimum length to width ratio of 5:1 and minimum depth-to-width ratio of 0.3:0.5.

To function with the variable flow water pump 101 and the water flow meter 107, the system of the present disclosure further comprises a first water gate valve 103, a second water gate valve 104, and a one way water valve 112. The variable flow water pump 101, the first water gate valve 103, the second water gate valve 104, and the one way water valve 112 are used to calibrate the water flow meter 107. To do so, the water section 115 of the oil-gas-water separation unit 100 is in fluid communication with the variable flow water pump 101 through the first water gate valve 103. In other words, a section of the piping system 445 extending from the water section 115 connects to the variable flow water pump 101 through the first water gate valve 103. A section of the piping system 445 extending from the variable flow water pump 101 is in fluid communication with the one way water valve 112 through the water flow meter 107 and the second gate valve.

To function with the variable flow oil pump 102 and the oil flow meter 108, the system of the present disclosure further comprises a first oil gate valve 105, a second oil gate valve 106, and a one way oil valve 111. The variable flow oil pump 102, the first oil gate valve 105, the second oil gate valve 106, and the one way oil valve 111 are used to calibrate the oil flow meter 108. The oil section 116 of the oil-gas-water separation unit 100 is in fluid communication with the variable flow oil pump 102 through the first oil gate valve 105. In other words, a section of the piping system 445 extending from the oil section 116 connects to the variable flow oil pump 102 through the first oil gate valve 105. A section of the piping system 445 extending from the variable flow oil pump 102 is in fluid communication with the one way oil valve 111 through the second oil gate valve 106.

The gas flow section 444 controls a gas volume of the multiphase fluid mixture used with the system of the present disclosure. To do so, in addition to the pressurized gas tank 401, the gas pressure regulator 403, and the gas flow meter 406, the gas flow section 444 comprises a gas gate valve 402, at least one temperature sensor 404, at least one pressure sensor 405, a gas flow control valve 407, and a one way gas valve 408. The pressurized gas tank 401, the gas gate valve 402, the gas pressure regulator 403, the gas flow meter 406, the gas flow control valve 407, and the one way gas valve 408 are in fluid communication with each other so that the gas entering the piping system 445 of the present disclosure can be controlled as preferred. The at least one temperature sensor 404 and the at least one pressure sensor 405 are operatively coupled with a gas line extending from the pressurized gas tank 401. Thus, accurate feedback regarding the temperature and pressure of the gas entering the piping system 445 can be acquired.

The type of variable flow pump used as the variable flow water pump 101 and the variable flow oil pump 102 can be, but are not limited to, a pressure dependent calibrated valve type, a pressure independent flow limiting valve type, and a pressure independent control (PIC) valve type. Pressure dependent calibrated valve types, commonly referred to as circuit setters are used for pre-set proportional system balancing. Circuit setters incorporate a ball valve and two pressure ports through which the entering and exiting pressures can be measured to determine the pressure drop across the valve. A calibrated plate makes it possible to balance and set flow. Circuit setters are field adjustable and may be preset prior to balancing. They are inexpensive and readily available, however getting them properly set up at system start-up can be require time and expertise, depending on the number of circuits. Being inexpensive, being field adjustable, and potentially being preset prior to balancing are some of the advantages of the pressure dependent calibrated valve type variable flow pumps. Requiring time and expertise for balancing is one of the disadvantage related to pressure dependent calibrated valve type variable flow pumps.

Pressure independent flow limiting valves have cartridges on the inside that move back and forth in response to system pressure changes. This movement increases or decreases the size of the internal orifice. When the entering pressure is low, the spring-loaded cartridge inside the valve opens, and in doing so allows more flow to pass through the valve despite the low pressure. As entering pressure increases, the pressure acts on the spring, compressing it and reducing the orifice size so that flow is limited through the valve. In either case, flow is quickly stabilized despite system pressure fluctuations—as long as the pressures are within the operating range of the specific valve. Maintaining constant flow despite pressure fluctuations, being pre-balanced, and having field adjustable operating ranges are some of the advantages of pressure independent flow limiting valve type variable flow pumps. Requiring additional pump head, which is the vertical distance that can be pumped, is one of the disadvantage related to pressure independent flow limiting valve type variable flow pumps.

PIC valves combine the functionality of a balancing valve, control valve and a differential pressure regulator all into one valve body. Generally, the recommendation is to use a valve that maintains its full stroke capability despite any preset maximum flow rate; therefore, the valve maintains full authority under all load conditions. PIC valves incorporate a spring loaded differential pressure regulator, which constantly adjusts and compensates for fluctuations in system pressure. This internal element responds to pressure changes by moving up or down to maintain a constant flow despite these fluctuations. That is the key benefit of PIC valves—a change in differential pressure does not cause a change in flow. PIC valves do not merely limit flow; they keep flow at a specific setting depending on the signal to the control valve. This eliminates underflows and overflows through the coil and ensures a much more consistent energy transfer. Improving system efficiency, lowering system energy cost, and providing stable flow are some of the advantages of PIC valve type variable flow pumps, and the related cost is a notable disadvantage of PIC valve type variable flow pumps.

The flow meter used as the water flow meter 107 and the oil flow meter 108 can be, but is not limited to a differential pressure flow meters, a positive displacement flow meter, a velocity flow meter, a mass flow meter, or an open channel flow meter. A differential pressure flow meter measures the differential pressure across an orifice where flow is directly related to the square root of the differential pressure produced. There are also primary and secondary elements in differential flow meters. The primary element produces change in kinetic energy using either flow nozzle, pitot tube, orifice plate, or venturi flow meters. The secondary element measures the differential pressure and provides the signal. Differential pressure meters represent around ⅓ of all flow meters around the world. They are commonly used in the oil & gas industry, along with heat, ventilation, and air conditioning (HVAC), beverage, water, pharma, mining, paper and chemical applications.

Positive displacement (PD) flow meters measure the volume filled with fluid, deliver it ahead and fill it again, which calculates the amount of fluid transferred. It measures actual flow of any fluid while all other types of flow meters measure some other parameter and convert the values into flowrate. In PD flow meters, output is directly related to the volume passing through the flow meter. PD flow meters include piston meters, oval-gear meters, nutating disk meters, rotary vane type meters, etc.

Positive displacement flow meters are known for their accuracy. They are commonly used in the transfer of oils and fluids, like gasoline, hydraulic fluids as well as in-home use for water and gas applications.

Velocity meters measure velocity of the stream to calculate the volumetric flowrate. These are less sensitive when the Reynolds number of fluid is higher than 10000. Velocity flow meters include turbine, paddlewheel, vortex shedding, electromagnetic and sonic/ultrasonic flow meters.

Mass flow meters are more effective in mass related processes as they measure the force that results from the acceleration of mass. More specifically, the force is measured as the mass moving per unit of time, instead of the volume per unit of time. Mass flow meters include Coriolis mass meters and thermal dispersion meters. Typical applications for mass flow meters are tied to chemical processes. In addition to the chemical and gas industries, typical industries using mass meters include pharma, power, mining and wastewater.

Measurement of liquid in open channels include v-notch, weirs and flumes. These dam-like structures, or overflows, allow for a limited or concentrated free-flow of liquids based on the unique shape and size of the structure. This type of flow meter allows for a reading of the flowrate to be calculated. Common applications of open channel meters include free flowing liquids like streams, rivers, irrigation channels and sewer/wastewater systems.

The gate valve used in the first water gate valve 103, the second water gate valve 104, the first oil gate valve 105, the second oil gate valve 106, and the gas gate valve 402 can be, but is not limited to, a solid wedge gate valve, a flexible wedge gate valve, a split wedge or parallel disks gate valve, an outside stem and screw type, and non-rising stem gate valve or insider screw type gate valve. A gate valve is generally used to completely shut off fluid flow or, in the fully open position, provide full flow in a pipeline. Thus, the gate valve is used either in the fully closed or fully open positions. A gate valve includes a valve body, seat and disc, a spindle, gland, and a wheel for operating the valve. The seat and the gate together perform the function of shutting off the flow of fluid.

Solid wedge gate valve type is most common & widely used type because of the simplicity and strength. A gate valve with a solid wedge may be installed in any position, and is suitable for almost all fluids. However, these type of gate valves do not compensate for changes in seat alignment due to pipe loads or thermal expansion. So, this type of disk design is most susceptible to leakage. Solid wedge is subjected to thermal locking if used in high-temperature service, wherein thermal locking is a phenomenon in which wedge is stuck between the seats due to the expansion of the metal. Solid-wedge gate valves are generally used in moderate to lower pressure-temperature applications.

The flexible wedge is a one-piece solid disk with a cut around the perimeter. These cuts vary in size, shape, and depth. A shallow, narrow cut on wedge perimeter gives less flexibility but retains strength. A cast-in recess or deeper and wider cut on wedge perimeter gives more flexibility but compromises the strength. This design improves seat alignment and offers better leak tightness. It also improves performance in situations where thermal binding is possible. Flexible wedges gate valves are used in steam systems. Thermal expansion of steam line sometime causes distortion of valve bodies which may lead to thermal blinding. The flexible gate allows the gate to flex as the valve seat compresses due to thermal expansion of steam pipeline and prevent thermal blinding. The disadvantage of flexible gates is that line fluid tends to collect in the disk. However, the design of the flexible wedge may result in corrosion and ultimately weaken the disk.

The split wedge disk type gate valve comprises of two solid pieces and holds together with the help of special mechanism. In case, one-half of the disk is out of alignment; the disk is free to adjust itself to the seating surface. The split disk can be in a wedge shape or a parallel disk type. Parallel disks are spring loaded, so they are always in contact with seats and give bi-directional sealing. Split wedge is suitable for handling noncondensing gasses and liquids at normal and high temperature. Freedom of movement of the disk prevents thermal binding even though the valve may have been closed when a line is cold. Therefore, when a line is heated by fluid and expanded it does not create thermal blinding.

In the outside stem and screw type, the stem will go up while opening the valve and move down when the valve is closed. In an inside screw design, the threaded portion of the stem is in contact with the flow medium and when valve is opened, a hand wheel rises with the stem. Whereas in the case of outside screw design, the only smooth portion is exposed to the flow medium and stem will rise above the hand wheel. This type of valve is also known as OS & Y valve, wherein OS & Y stands for outside steam and York.

In the non-rising stem gate valve or insider screw type gate valve, which is also known as an insider screw valve, there is no upward movement of the stem in a non-rising stem type. The valve disk is threaded internally. The disc travels along the stem like a nut when the stem is rotated. In this type of valve, stem threads are exposed to the flow medium. Therefore, this design is used where space is limited to allow linear stem movement, and the flow medium does not cause erosion, corrosion, or wear and tear to stem material.

The one way valve that is used in the one way water valve 112, the one way oil valve 111, and the one way gas valve 408 can be, but is not limited to, a duckbill valve, an umbrella valve, a mini valve ball, or a cross-slit valve. In general, a one way valve is a component used to create a unidirectional flow in a device. They are in fact elastomeric sealing elements that allow forward flow and prevent backflow.

Duckbill valves are unique, one-piece, elastomeric components that act as backflow prevention devices or one-way valves or check valves. They have elastomeric lips in the shape of a duckbill which prevent backflow and allow forward flow. The main advantage of duckbill valves over other types of one-way valves is that duckbill valves are self-contained i.e. the critical sealing function is an integral part of the one piece elastomeric component as opposed to valves where a sealing element has to engage with a smooth seat surface to form a seal. Therefore, duckbill valves are easily incorporated and assembled into a wide variety of devices without the hassle or problems associated with the surface finish quality of mating seats and/or complex assembly processes.

The application of umbrella valves include vessel vent valves such as for automotive fuel tanks, in- and outlet valves for piston- and diaphragm pumps, one-way check valves in (disposable) breathing masks, and numerous other fluid control functions in medical devices, home appliances, cars and toys. Umbrella valves are elastomeric valve components that have a diaphragm shaped sealing disk or an umbrella shape. These elastomeric components are used as sealing elements in backflow prevention devices or one-way valves or check valves, in vent valves or pressure relief valves and in metering valves. When mounted in a seat, the convex diaphragm flattens out against the valve seat and absorbs a certain amount of seat irregularities and creates a certain sealing force. The umbrella valve will allow forward flow once the head pressure creates enough force to lift the convex diaphragm from the seat and so it will allow flow at a predetermined pressure in one way and prevent back flow immediately in the opposite way. The main advantage compared to other types of valves such as spring loaded disc valves is that an umbrella valve uses the elastic material properties and the preloaded convex shape to create the sealing force against the seat and that it uses the central stem to hold the component in place so as to avoid the need for additional components such as a spring and the need for a central or circumferential disc positioner(s). This simplifies the design of the assembly and makes the valve adaptable to minimal space, reduces the number of pieces in a valve, simplifies assembly and last but not least is very cost effective.

Mini valve balls are the simplest example of a check valve or one-way valve. When in use, a ball moves freely downstream of a flow orifice. Upon back flow the ball moves with the flow and closes the orifice and so blocks further back flow. This type of free shuttling valve will have the lowest opening pressure but will require some initial back flow and thus leakage to close. Functionality can be improved with using a light spring to keep the valve against the seat at zero pressure differential. With higher spring forces a pressure relief valve can also be created.

Cross-slit valves, which belong in the duckbill valve family, have the same features and benefits as the duckbill valves. The main advantage over a regular duckbill valve is that the cross-slit valve has a relatively larger flow capacity. On the other hand, cross-slit valves have a non-tortuous, straight line flow path as well and therefore can be used in applications where instruments are pushed through the valve. Such as in a Trocar used for minimal invasive surgery procedures. Gas is prevented from venting out of the body cavity with either the instrument inserted or withdrawn from the Trocar. One particular problem associated with using a backup seal is when various diameters of instruments are used in combination with a high back pressure. The larger the diameter range and the larger the pressure the higher the insertion force.

The pressurized gas tank 401 used in the system of the present disclosure can be made of, but is not limited to, aluminum, steel, alloys, and composite materials. Mechanical strength, corrosion resistance, and impact resistance are critical factors in determining which material is used. Carbon fiber composite cylinders can be very light due to the high tensile strength of carbon fiber, but are more difficult to manufacture.

The gas pressure regulator 403 used in the gas flow section 444 can be, but is not limited to, a line gas pressure regulator, a general purpose gas pressure regulator, a high-purity gas pressure regulator, and a special service gas pressure regulator. Typically, line gas pressure regulators are point-of-use gas pressure regulators that serve low-pressure pipelines. These type of regulators can be used in conjunction with high-pressure cylinder regulators that limit the inlet pressure to 250 pounds per square inch gauge (psig) to 400 psig. General purpose gas regulators are designed for economy and longevity, and are recommended for noncorrosive general plant, pilot plant, and maintenance shop applications. High-purity gas pressure regulators are designed and constructed to provide diffusion, resistance, and easy clean up. In high-purity gas pressure regulators, inboard diffusion is minimized or eliminated by metal diaphragms and high-purity seats and seals. Special service gas pressure regulators are specifically constructed for specialized applications including oxygen, acetylene and fluorine service, high-pressure, ultra-high-pressure, and corrosion service. Additional custom gas pressure regulators are also available.

The at least one temperature sensor 404 used within the gas flow section 444 can be, but is not limited to, a negative temperature coefficient (NTC) thermistor type, a resistance temperature detector (RTD) type, a thermocouple type, or a semiconductor-based sensor type.

In a NTC thermistor type temperature sensor, a large, predictable, and precise change is resistance correlated to variations in temperature is exhibited. A NTC thermistor provides a very high resistance at low temperatures. As temperature increases, the resistance drops quickly. Because an NTC thermistor experiences such a large change in resistance per ° C., small changes in temperature are reflected very fast and with high accuracy (0.05 centigrade (° C.) to 1.5° C.). Because of its exponential nature, the output of an NTC thermistor requires linearization. The effective operating range is −50° C. to 250° C. for glass encapsulated thermistors or 150° C. for standard thermistors.

An RTD, also known as a resistance thermometer, measures temperature by correlating the resistance of the RTD element with temperature. An RTD comprises of a film or, for greater accuracy, a wire wrapped around a ceramic or glass core. The most accurate RTDs are made using platinum, but lower-cost RTDs can be made from nickel or copper that are not as stable or repeatable. Platinum RTDs offer a fairly linear output that is highly accurate (0.1° C. to 1° C.) across −200° C. to 600° C. While providing the greatest accuracy, RTDs also tend to be the most expensive of temperature sensors.

A thermocouple temperature sensor type comprises of two wires of different metals connected at two points. The varying voltage between these two points reflects proportional changes in temperature. Thermocouples are nonlinear, requiring conversion when used for temperature control and compensation, typically accomplished using a lookup table. Accuracy is low, from 0.5° C. to 5° C. However, thermocouple temperature sensor types operate across the widest temperature range, from −200° C. to 1750° C.

A semiconductor-based temperature sensor is placed on integrated circuits (ICs). Thus, if utilized with the system of the present disclosure, the semiconductor-based temperature sensor can be integrated into an electrical circuit associated with the flow data acquisition unit 400. These sensors are effectively two identical diodes with temperature-sensitive voltage vs current characteristics that can be used to monitor changes in temperature. They offer a linear response but have the lowest accuracy of the basic sensor types at 1° C. to 5° C. They also have the slowest responsiveness (5 s to 60 s) across the narrowest temperature range (−70° C. to 150° C.).

The at least one pressure sensor 405 used within the gas flow section 444 can be, but is not limited to, an aneroid barometer sensor, a manometer sensor, a bourdon tube pressure sensor, and a vacuum pressure sensor.

An aneroid barometer sensor is composed of a hollow metal casing that has flexible surfaces on its top and bottom. Atmospheric pressure changes cause the metal casing to change shape, with mechanical levers augmenting the deformation in order to provide more noticeable results. The level of deformation can also be enhanced by manufacturing the sensor in a bellows design. The levers are usually attached to a pointer dial that translates pressurized deformation into scaled measurements or to a barograph that records pressure change over time. Aneroid barometer sensors are compact and durable, employing no liquid in their operations. However, the mass of the pressure sensing elements limit the device's response rate, making it less effective for dynamic pressure sensing projects.

A manometer is a fluid pressure sensor that provides a relatively simple design structure and an accuracy level greater than that afforded by most aneroid barometers. The manometer takes measurements by recording the effect of pressure on a column of liquid. The most common form of manometer is the U-shaped model in which pressure is applied to one side of a tube, displacing liquid and causing a drop in fluid level at one end and a correlating rise at the other. The pressure level is indicated by the difference in height between the two ends of the tube, and measurement is taken according to a scale built into the device. The precision of a reading can be increased by tilting one of the manometer's legs. A fluid reservoir can also be attached to render the height decreases in one of the legs insignificant. Manometers can be effective as gauge sensors if one leg of the U-shaped tube vents into the atmosphere, and they can function as differential sensors when pressure is applied to both legs. However, they are only effective within a specific pressure range and, like aneroid barometers, have a slow response rate that is inadequate for dynamic pressure sensing.

Although bourdon tube pressure sensors function according to the same essential principles as aneroid barometers, bourdon tubes employ a helical or C-shaped sensing element instead of a hollow capsule. One end of the bourdon tube is fixed into connection with the pressure, while the other end is closed. Each tube has an elliptical cross-section that causes the tube to straighten as more pressure is applied. The instrument will continue to straighten until fluid pressure is matched by the elastic resistance of the tube. For this reason, different tube materials are associated with different pressure ranges. A gear assembly is attached to the closed end of the tube and moves a pointer along a graduated dial to provide readings. Bourdon tube devices are commonly used as gauge pressure sensors and as differential sensors when two tubes are connected to a single pointer. Generally, the helical tube is more compact and offers more reliable performance than the C-shaped sensing element.

Vacuum pressure is generally below atmospheric pressure levels, and can be challenging to be detected through mechanical methods. Pirani sensors are commonly used for measurements in the low vacuum range, and rely on a heated wire with electrical resistance correlating to temperature. When vacuum pressure increases, convection is reduced and wire temperature rises. Electrical resistance rises proportionally and is calibrated against pressure in order to provide an effective measurement of the vacuum.

Ion or cold cathode sensors are commonly used for higher vacuum range applications. These instruments rely on a filament that generates electron emissions. The electrons pass onto a grid where they may collide with gas molecules, thereby causing them to be ionized. A charged collection device attracts the charged ions, and the number of ions it accumulates directly corresponds to the amount of molecules within the vacuum, thus providing an accurate reading of the vacuum pressure.

In a preferred embodiment of the system of the present disclosure, a factory calibrated gas flow meter can be utilized. The gas flow meter 406 utilized in the system can be, but is not limited to, a laminar differential pressure (DP) based flow meter, a thermal flow meter, a Coriolis flow meter, an ultrasonic flow meter, or a variable area flow meter.

When considering the functionality, a laminar DP based flow meter uses the pressure drop created within a laminar flow element to measure the mass flow rate of a fluid. A laminar flow element converts turbulent flow into laminar flow by separating it into an array of thin, parallel channels. The decrease in pressure, or pressure drop, across the channel is measured using a differential pressure sensor. Because the flow is not turbulent, but laminar, the Poiseuille Equation can then be used to relate the pressure drop to the volumetric flow rate. The volumetric flow rate can also be converted to a mass flow rate using density correction at a given temperature and pressure.

Thermal flow meters use heat to measure the flow rate of a fluid. Thermal flow meters traditionally work in one of two ways. The first type measures the current required to maintain a fixed temperature across a heated element. As the fluid flows, particles contact the element and dissipate or carry away heat. As the flow rate increases, more current is required to keep the element at a fixed temperature, and the current requirement is proportional to the mass flow rate. The second thermal method involves measuring the temperature at two points on either side of an element or 'hot wire'. As the fluid flows over the element it carries the heat downstream, increasing the temperature of the downstream temperature sensor and reducing the temperature of the upstream sensor. The change in temperature is related to the fluid's mass flow.

The Coriolis flow meter uses the Coriolis effect to measure the mass flow of a fluid. The fluid travels through single or dual curved tubes. A vibration is applied to the tube(s). The Coriolis force acts on the fluid particles perpendicular to the vibration and the direction of the flow. While the tube is vibrating upward, the fluid flow in forces down on the tube. As the fluid flows out of the tube, it forces upward. This creates torque, twisting the tube. The inverse process occurs when the tube is vibrating downward. These opposing forces cause the tube to twist, the amplitude of which is directly related to mass flow of the fluid through the tube.

Ultrasonic flow meters use sound waves to measure the flow rate of a fluid. Doppler flow meters transmit ultrasonic sound waves into the fluid. These waves are reflected off particles and bubbles in the fluid. The frequency change between the transmitted wave and the received wave can be used to measure the velocity of the fluid flow. Time of flight flow meters use the frequency change between transmitted and received sound waves to calculate the velocity of a flow.

Variable area flow meters, or rotameters, use a tube and float to measure flow. As the fluid flows through the tube, the float rises. Equilibrium will be reached when pressure and the buoyancy of the float counterbalance gravity. The float's height in the tube is then used to reference a flow rate on a calibrated measurement reference.

The gas flow control valve 407 can be, but is not limited to, a diaphragm valve, a ball valve, and a butterfly valve. Diaphragm valves can be manual or automated. Automated diaphragm valves may use pneumatic, hydraulic or electric actuators along with accessories such as solenoid valves, limit switches and positioners. In addition to the well-known, two way shut off or throttling diaphragm valve, other types include: Three way zero deadleg valve, sterile access port, block and bleed, valbow and tank bottom valve.

The ball valve's ease of operation, repair, and versatility has resulted in extensive industrial use, supporting pressures up to 1,000 bar (100 MPa; 15,000 psi) and temperatures up to 752° F. (400° C.), depending on design and materials used. Sizes typically range from 0.2 to 48 inches (5.1 to 1,219.2 mm). Valve bodies are made of metal, plastic, or metal with a ceramic; floating balls are often chrome plated for durability. One disadvantage of a ball valve is that they trap water in the center cavity while in the closed position. In the event of a freeze, the sides can crack due to expansion of ice forming. Some means of insulation or heat tape in this situation will usually prevent damage. Another option for cold climates is the "freeze tolerant ball valve". This style of ball valve incorporates a freeze plug in the side so in the event of a freeze up, the freeze plug ruptures (acts as a sacrificial disk), thus making for an easy repair. Now instead of replacing the whole valve, just screw in a new freeze plug.

Operation of a butterfly valve is similar to that of a ball valve, which allows for quick shut off. Butterfly valves are generally favored because they cost less than other valve designs, and are lighter weight so they need less support. The disc is positioned in the center of the pipe. A rod passes through the disc to an actuator on the outside of the valve. Rotating the actuator turns the disc either parallel or perpendicular to the flow. Unlike a ball valve, the disc is always present within the flow, so it induces a pressure drop, even when open.

The downstream homogenizer 409 is used for thorough mixing of the fluid mixture containing a gas component. To do so, the downstream homogenizer 409 is operatively coupled in between the multiphase flow calibration unit 200 and both the oil-gas-water separation unit 100 and the gas flow section 444. More specifically, an output from the water section 115, an output from the oil section 116, and an output from the gas flow section 444 are transferred through the downstream homogenizer 409, a temperature sensor 113, a pressure sensor 114, and into the multiphase flow calibration unit 200. The downstream homogenizer 409 used in the system of the present disclosure, is preferably a high downstream homogenizer that is usually used with liquids and similar materials. High pressure homogenizers force a liquid stream under high pressure, wherein the pressure can be up to 1500 bar/21,750 pounds per square inch (psi). High-pressure homogenizers consist of a tank to which high pressure is applied in order to force the liquid sample contained therein through a valve or membrane with very narrow slits. This act causes high shear, a large pressure drop, and cavitation, all of which act to homogenize the sample. High-pressure homogenizers are most commonly used for creating emulsions and for cell lysis when relatively large volumes are being processed.

Figure 2:
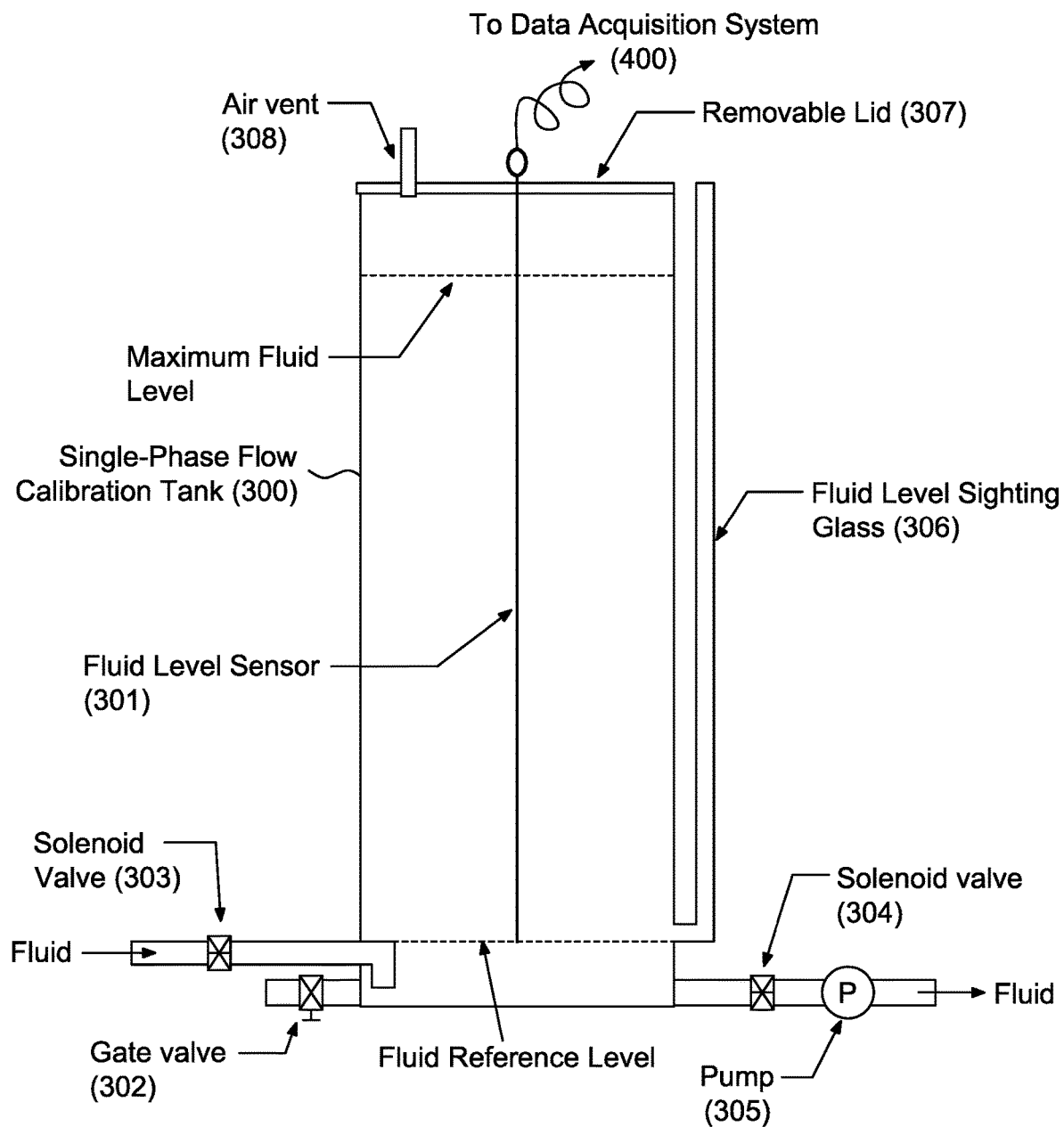
FIG. 2 is an illustration of the single phase flow calibration section used in the system of the present disclosure.

The single phase flow calibration section 333, which is used for calibrating the water flow meter 107 and the oil flow meter 108, comprises a single phase calibration tank 300, a fluid level sensor 301, a drain gate valve 302, a single phase solenoid valve 303, a return single phase solenoid valve 304, a return fluid pump 305, a fluid level sighting glass 306, an air vent 308, and a removable lid 307. The drain gate valve 302 and the removable lid 307 are used for cleaning and maintaining the single phase calibration tank 300. To do so, the drain gate valve 302 is in fluid communication with the single phase calibration tank 300 and the removable lid 307 is removably attached to the single phase calibration tank 300. The air vent 308 traverses through the removable lid 307. Therefore, when the removable lid 307 is attached to the single phase calibration tank 300, the air vent 308 can release the pressure from within the single phase calibration tank 300. The fluid level sighting glass 306, which extends outwards from the single phase calibration tank 300, is used to manually monitor a fluid level within the single phase calibration tank 300. In particular, the fluid level sighting glass 306 is used to view the fluid level sensor 301 that gives feedback regarding the fluid level on a real-time basis. To do so, the fluid level sensor 301 is positioned within the single phase calibration tank 300. As seen in FIG. 2, the fluid level sensor 301 monitors a fluid level from a reference level to a maximum level within the single phase calibration tank 300. Since the single phase flow calibration section 333 is communicably coupled with the flow data acquisition unit 400, the fluid level within the single phase calibration tank 300 is automatically recorded by the flow data acquisition unit 400. In order to perform the calibration processes, the multiphase flow calibration unit 200 is in fluid communication with the single phase calibration tank 300 through the single phase solenoid valve 303. In order to match a reference level, the single phase calibration tank 300 is in fluid communication with the return fluid pump 305 through the return single phase solenoid valve 304. More specifically, if a fluid level is above the reference level, the extra volume of water is pumped back to the water section 115 using the return fluid pump 305. To do so, the return fluid pump 305 is in fluid communication with the water section 115 of the oil-gas-water separation unit 100.

The fluid level sensor 301 in a preferred embodiment of the system of the present disclosure can be, but is not limited to, a magnetically actuated float sensor, a pneumatic level sensor, or a conductive level sensor.

With magnetically actuated float sensors, switching occurs when a permanent magnet sealed inside a float rises or falls to the actuation level. With a mechanically actuated float, switching occurs as a result of the movement of a float against a miniature (micro) switch. For both magnetic and mechanical float level sensors, chemical compatibility, temperature, specific gravity (density), buoyancy, and viscosity affect the selection of the stem and the float. For example, larger floats may be used with liquids with specific gravities as low as 0.5 while still maintaining buoyancy. The choice of float material is also influenced by temperature-induced changes in specific gravity and viscosity—changes that directly affect buoyancy.

Pneumatic level sensors are used where hazardous conditions exist, where there is no electric power or its use is restricted, or in applications involving heavy sludge or slurry. As the compression of a column of air against a diaphragm is used to actuate a switch, no process liquid contacts the sensor's moving parts. These sensors are suitable for use with highly viscous liquids such as grease, as well as water-based and corrosive liquids. The use of pneumatic level sensors gives the additional benefit of being a relatively low cost technique for point level monitoring. A variation of this technique is the "bubbler", which compresses air into a tube to the bottom of the tank, until the pressure increase halts as the air pressure gets high enough to expel air bubbles from the bottom of the tube, overcoming the pressure there. The measurement of the stabilized air pressure indicates the pressure at the bottom of the tank, and, hence, the mass of fluid above.

Conductive level sensors are ideal for the point level detection of a wide range of conductive liquids such as water, and is especially well suited for highly corrosive liquids such as caustic soda, hydrochloric acid, nitric acid, ferric chloride, and similar liquids. For those conductive liquids that are corrosive, the sensor's electrodes need to be constructed from titanium, Hastelloy B or C, or 316 stainless steel and insulated with spacers, separators or holders of ceramic, polyethylene and Teflon-based materials. Depending on their design, multiple electrodes of differing lengths can be used with one holder. Since corrosive liquids become more aggressive as temperature and pressure increase, these extreme conditions need to be considered when specifying these sensors.

As described earlier, similar to the first water gate valve 103, the second water gate valve 104, the first oil gate valve 105, and the second oil gate valve 106, the gate valve used in the drain gate valve 302 can be, but not limited to, a solid wedge gate valve, a flexible wedge gate valve, a split wedge or parallel disks gate valve, an outside stem and screw type, and non-rising stem gate valve or insider screw type gate valve.

Solenoid valves control the flow rate of fluid and gases in systems, devices, and motors. These control valves that are uniquely distinctive and have varying types evidently have carried out simple to complex tasks without difficulty. These can be made particularly to match specialized needs and used to control liquids, gases, oils, electricity, among other mediums from low to high temperatures. These valves have been useful to various systems, control cylinders, motors, and other industrial valves acting on more than a few fundamental and multifaceted applications. The type of solenoid valve used as the single phase solenoid valve 303 and the return single phase solenoid valve 304 can be, but are not limited to, a direct acting valve or a pilot-operated valve. In a direct acting valve, the force of a coil opens the valve port by taking the pin from the base of the valve. Direct acting solenoid valve relies on the level of current in the coil to work. This valve opens and closes notwithstanding the flow and pressure provided that the available maximum pressure is not surpassed. In the pilot-operated valve, a pilot and main valve seats with orifices and a main valve diaphragm with restraining orifice. The top portion of the valve is comprised of the pilot seat with corresponding orifice. The pilot orifice is opened and closed by the plunger. The inlet line pressure causes to open and close the valve seal and goes through the pilot orifice. The pilot-operated valve always necessitates full power both to open and to be kept open.

The fluid pump used as the return fluid pump 305 can be, but is not limited to, a piston pump, a circumferential-piston pump, a diaphragm pump, or a gear pump. The piston pump is a positive displacement pump that usually comprises of one or more pistons that draw fluid through an inlet check valve and expel the fluid through an outlet valve. Fluid volume delivered depends on plunger diameter and stroke length; diameter cannot be varied in a given pump, so stroke length is made adjustable. Most plunger pumps must be stopped for stroke adjustment, but a few offer the option of in-service adjustment. Outlet pressures delivered by plunger pumps are as high as 50,000 psi for some lab units. Maximum pressures for industrial pumps usually range from 5,000 to 30,000 psi. Maximum flow is as high as 26 gallons per minute (gpm) for traditional plunger pumps and much higher for multi-piston units.

Circumferential-piston pumps use counter-rotating rotors driven by external timing gears. They are self-priming and have high suction lift capability. With capacities up to 450 gpm, the pumps are often used for shear-sensitive fluids, or those with entrained particles or gases.

Diaphragm and bellows pumps are used when pump leakage or process-fluid contamination cannot be tolerated. They offer the freedom from external leakage of a peristaltic pump, yet permit higher pressures and easy flow adjustment. Diaphragm and bellows pumps generally tend to cost more than peristaltic pumps for the same flow delivered. Generally, diaphragm pumps are built like a plunger unit, except that a bellows or diaphragm is fitted to the end of the plunger shaft. This configuration, while providing a positive seal, stresses the diaphragm because of unequal loading from the plunger. To equalize diaphragm loading, some pumps are built so the plunger never contacts the diaphragm; instead, the plunger pressurizes a small volume of hydraulic fluid as it moves, and the fluid displaces the diaphragm. Diaphragm pumps of this type can deliver outlet pressures to 5,000 psi.

Gear pumps, often used in fluid-power applications, perform equally as well as fluid-handling pumps. The gears can be arranged as a pair of similarly sized gears, as three stacked gears, as separated internal gears, or as gerotors which are positive displacement pumps. Displacement of gear pumps is fixed, and cannot be varied during operation.

To perform the calibration processes, the system of the present disclosure further comprises a multiphase solenoid valve 109. The multiphase flow calibration unit 200 is in fluid communication with the oil-gas-water separation unit 100 through the multiphase solenoid valve 109 creating a semi-closed loop system. Similar to the single phase solenoid valve 303 and the return single phase solenoid valve 304, the type of solenoid valve used as the multiphase solenoid valve 109 can be, but is not limited to, a direct acting valve or a pilot-operated valve. Direct acting solenoid valves are preferably used in the disclosed system.

As seen in FIG. 3, the system of the present disclosure further comprises a flow controller 600 that is used to control the variable flow water pump 101 and the variable flow oil pump 102 based upon the signals received from the water flow meter 107 and the oil flow meter 108. In other words, the flow controller 600 has the capability of selecting a desired oil flow rate, a desired water flow rate, and a desired gas flow rate. To do so, the water flow meter 107, the oil flow meter 108, and the gas flow meter 406 are communicably coupled with the flow controller 600, and the flow controller 600 is operatively coupled with the variable flow water pump 101 the variable flow oil pump 102, and the gas flow control valve 407. The flow controller 600 in a preferred embodiment of the present disclosure can be, but is not limited to, a mass flow controller (MFC) which is a device used to measure and control the flow of liquids and gases. A mass flow controller is designed and calibrated to control a specific type of liquid or gas at a particular range of flow rates. The MFC can be given a set point from 0 to 100% of its full scale range but is typically operated in the 10% to 90% of full scale where the best accuracy is achieved. The device will then control the rate of flow to the given set point. MFCs can be either analog or digital. A digital flow controller is usually able to control more than one type of fluid whereas an analog controller is limited to the fluid for which it was calibrated.

As described earlier, the flow data acquisition unit 400 receives a plurality of feedback signals from the oil-gas-water separation unit 100, the multiphase flow calibration unit 200, the single phase flow calibration section 333, and the gas flow section 444 and transfers the plurality of feedback signals to the PLC 500 so that the PLC 500 can control components that can be, but are not limited to, a plurality of pumps, a plurality of valves, and at least one regulator. In a preferred embodiment of the present disclosure, the flow data acquisition unit 400 is a microprocessor based flow data acquisition unit that monitors and processes real-time data. Preferably, the flow data acquisition unit 400 is configured to display a plurality of parameters associated with the system of the present disclosure on a display screen. The data acquisition system will also record and store the real-time data for offline detailed data analysis.

In order to utilize the system of the present disclosure for calibration purposes, the oil-gas-water separation unit 100, the multiphase flow calibration unit 200, and the single phase flow section are in fluid communication with each other through the piping system 445. Moreover, the gas flow section 444, which manages a gas component of a fluid mixture, is operatively coupled with the piping system 445 in between the oil-gas-water separation unit 100 and the multiphase flow calibration unit 200. The overall positioning of the gas flow section 444 ensures that the system of the present disclosure can be used for multiphase flow meter calibration. The oil-gas-water separation unit 100, the multiphase flow calibration unit 200, the single phase flow section, and the gas flow section 444 are communicably coupled with the flow data acquisition unit 400 such that real time data can be monitored, processed, and displayed when the flow data acquisition unit 400 receives a plurality of feedback signals, wherein the plurality of feedback signals are generated from the oil-gas-water separation unit 100, the multiphase flow calibration unit 200, the single phase flow calibration section 333, and the gas flow section 444. Upon receiving the plurality of feedback signals, the PLC 500, which is communicably coupled with the flow data acquisition unit 400, proceeds to control a plurality of pumps, a plurality of valves, and at least one regulator that are associated with flow meter calibration.

When the system of the present disclosure is used to calibrate single phase oil flow meters and single phase water flow meters, the water flow meter 107 and the oil flow meter 108 are separately calibrated. In both instances, the single phase calibration tank 300 is used for monitoring purposes, wherein the drain gate valve 302 is always kept in a closed position unless the single phase calibration tank 300 requires cleaning.

When the water flow meter 107 is calibrated, the first water gate valve 103 and the second water gate valve 104 that are in fluid communication with the water flow meter 107 are left in an open position. Since the water flow meter 107 is calibrated independent of the oil flow meter 108, wherein the oil flow meter 108 is positioned in parallel with the water flow meter 107, the first oil gate valve 105 and the second oil gate valve 106 that are in fluid communication with the oil flow meter 108 are kept in a closed position. The gas gate valve 402 that controls the flow of gas from the pressurized gas tank 401, is also kept in a closed position. Moreover, the PLC 500 keeps the multiphase solenoid valve 109, the single phase solenoid valve 303, and the return single phase solenoid valve 304 in a closed position.

In order to calibrate the water flow meter 107, a desired flow rate for the water flow meter 107 is set using the flow controller 600 which is in fluid communication with the water flow meter 107. More specifically, a calibration option corresponding to the water flow meter 107 calibration is selected in the flow controller 600. In reference to FIG. 3, the calibration option 001 is selected.

With the first water gate valve 103 and the second water gate valve 104 in the open position, a position of the fluid level sensor 301 within the single phase calibration tank 300 is monitored. In particular, a feedback signal corresponding to a position of the fluid level sensor 301, wherein the feedback signal is from the plurality of feedback signals generated within the system, is received from the fluid level sensor 301. From the feedback signal that is received, the PLC 500 determines if the multiphase solenoid valve 109 needs to be open or closed. If the feedback signal corresponds to a position below a reference level of the single phase calibration tank 300, the multiphase solenoid valve 109 is opened and the variable flow water pump 101 is activated. More specifically, the reference level corresponds to a level determined by the flow controller 600. By opening the multiphase solenoid valve 109 and activating the variable flow water pump 101, the variable flow water pump 101 is allowed to draw a volume of water from the oil-gas-water separation unit 100 and transfer the volume of water through the water flow meter 107. By drawing the volume of water, the fluid level sensor 301 can rise to match the reference level determined by the flow controller 600 calibration option 001.

On the other hand, if the feedback signal corresponds to a position above the reference level of the single phase calibration tank 300, the PLC 500 opens the return single phase solenoid valve 304 and activates the return fluid pump 305. By doing so, the water within the single phase calibration tank 300 is reduced and thus, the fluid level sensor 301 lowers to a position below the reference level. When the fluid level sensor 301 obtains a position below the reference level, the PLC 500 closes the return single phase solenoid valve 304 and deactivates the return fluid pump 305.

When the position of the fluid level sensor 301 meets the reference level determined by the flow controller 600, the PLC 500 proceeds to close the multiphase solenoid valve 109 and open the single phase solenoid valve 303. By doing so, water is allowed to flow into the single phase calibration tank 300 and the fluid level sensor 301 is continuously monitored through the feedback signal received by the flow data acquisition unit 400. Moreover, the flow data acquisition unit 400 also records real time data from the fluid level sensor 301. The calibration is preferably carried out offline. The data collected from the calibration unit and the individual flow meters is used to obtain the calibration constant of the flow meter to be calibrated. When the feedback signal from the fluid level sensor 301 corresponds to a maximum fluid level position of the single phase calibration tank 300, the PLC 500 proceeds to deactivate the variable flow water pump 101 and close the single phase solenoid valve 303.

The process monitoring and recording is reiterated by setting different water flow rates for the water flow meter 107. In particular, the process is continued until a full range of water flow rates for the water flow meter 107 is covered. When the data accumulation process is complete, the real time data recorded by the flow data acquisition unit 400 at the single phase calibration tank 300 for different water flow rates are plotted against a set of water flow rate data obtained from the water flow meter 107 to calculate a calibration constant for the water flow meter 107.

When the oil flow meter 108 is calibrated, the first oil gate valve 105 and the second oil gate valve 106 that are in fluid communication with the oil flow meter 108 are in an open position. Since the oil flow meter 108 is calibrated independent of the water flow meter 107, wherein the water flow meter 107 is positioned in parallel with the oil flow meter 108, the first water gate valve 103 and the second water gate valve 104 that are in fluid communication with the water flow meter 107 are kept in a closed position. The gas gate valve 402, which controls the flow of gas from the pressurized gas tank 401, is also kept in a closed position. Moreover, the PLC 500 keeps the multiphase solenoid valve 109, the single phase solenoid valve 303, and the return single phase solenoid valve 304 in a closed position. In order to calibrate the oil flow meter 108, a desired flow rate for the oil flow meter 108 is set using the flow controller 600 which is in fluid communication with the oil flow meter 108. More specifically, a calibration option corresponding to the oil flow meter 108 calibration is selected in the flow controller 600. In reference to FIG. 3, the calibration option 002 is selected.

With the first oil gate valve 105 and the second oil gate valve 106 in the open position, a position of the fluid level sensor 301 within the single phase calibration tank 300 is monitored. In particular, a feedback signal corresponding to a position of the fluid level sensor 301, wherein the feedback signal is from the plurality of feedback signals generated within the system, is received from the fluid level sensor 301. From the feedback signal that is received, the PLC 500 determines if the multiphase solenoid valve 109 needs to be open or closed. If the feedback signal corresponds to a position below a reference level of the single phase calibration tank 300, the multiphase solenoid valve 109 is opened and the variable flow oil pump 102 is activated. More specifically, the reference level corresponds to a level determined by the flow controller 600. By opening the multiphase solenoid valve 109 and activating the variable flow oil pump 102, the variable flow oil pump 102 can draw a volume of oil from the oil-gas-water separation unit 100 and transfer the volume of oil through the oil flow meter 108. By drawing the volume of oil, the fluid level sensor 301 can rise to match the reference level determined by the flow controller 600. On the other hand, if the feedback signal corresponds to a position above the reference level of the single phase calibration tank 300, the PLC 500 opens the return single phase solenoid valve 304 and activates the return fluid pump 305. By doing so, the oil within the single phase calibration tank 300 is reduced and thus, the fluid level sensor 301 lowers to a position below the reference level. When the fluid level sensor 301 obtains a position below the reference level, the PLC 500 closes the return single phase solenoid valve 304 and deactivates the return fluid pump 305.

When the position of the fluid level sensor 301 meets the reference level determined by the flow controller 600, the PLC 500 proceeds to close the multiphase solenoid valve 109 and open the single phase solenoid valve 303. By doing so, oil is allowed to flow into the single phase calibration tank 300 and the fluid level sensor 301 is continuously monitored through the feedback signal received by the flow data acquisition unit 400. Moreover, the flow data acquisition unit 400 also records real time data from the fluid level sensor 301. When the feedback signal from the fluid level sensor 301 corresponds to a maximum fluid level position of the single phase calibration tank 300, the PLC 500 proceeds to deactivate the variable flow oil pump 102 and close the single phase solenoid valve 303.

The process monitoring and recording is reiterated by setting different oil flow rates for the oil flow meter 108. In particular, the process is continued until a full range of oil flow rates for the oil flow meter 108 are covered. When the data accumulation process is complete, the real time data recorded by the flow data acquisition unit 400 at the single phase calibration tank 300 for different oil flow rates are plotted against a set of oil flow rate data obtained from the oil flow meter 108 to calculate a calibration constant for the oil flow meter 108.

As described earlier, in a preferred embodiment of the present disclosure, a factory calibrated gas flow meter will be utilized. The gas flow meter 406 utilized in the system can be, but is not limited to, a laminar differential pressure (DP) based flow meter, a thermal flow meter, a Coriolis flow meter, an ultrasonic flow meter, or a variable area flow meter.

The system of the present disclosure can be used for of single phase, two phase, and three phase flow meter calibration and water cut meter calibration. In particular, the system of the present disclosure can be used for calibrating single phase flow meters for gas, single phase flow meters for oil, single phase flow meters for water, two phase flow meters for gas and oil, two phase flow meters for oil and water, two phase flow meters for water and gas, three phase flow meters for oil, gas, and water, water cut meters for two phase flows, and water cut meters for three phase flows.

The system of the present disclosure utilizes the water flow meter 107, the oil flow meter 108, and the gas flow meter 406 that are calibrated as described above along with the multiphase flow calibration unit 200 and the downstream homogenizer 409 to calibrate multiphase flow meters or multiphase water cut meters.

When the system of the present disclosure is being used for calibrating a multiphase flow meter or a multiphase water meter, a first water gate valve 103, a second water gate valve 104, a first oil gate valve 105, and a second oil gate valve 106 are in an open position. The first water gate valve 103 and the second water gate valve 104 are in fluid communication with the water flow meter 107, and the first oil gate valve 105 and the second oil gate valve 106 are in fluid communication with the oil flow meter 108. Moreover, the multiphase solenoid valve 109 is in an open position through the PLC 500. The single phase solenoid valve 303 and the return single phase solenoid valve 304 remain in a closed position during the calibration process.

In order to perform the multiphase flow meter calibration process, a desired fluid mixture flow rate for the multiphase flow meter is set using the flow controller 600. By doing so, a volumetric flow for the water, oil, and gas is managed by the flow controller 600. Based upon the desired fluid mixture flow rate that corresponds to a calibration setting of the flow controller 600, the variable flow water pump 101 draws a volume of water from the water section 115, and the variable flow oil pump 102 draws a volume of oil from the oil section 116. The volume of water and the volume of oil are then transferred through the multiphase flow calibration unit 200 using the piping system 445, wherein the multiphase flow meter is integrated into the multiphase flow calibration unit 200.

In doing so, a fluid mixture pressure value is recorded at the multiphase flow calibration unit 200 and sent to the flow data acquisition unit 400 from a pressure sensor 114 at the multiphase flow calibration unit 200 as a feedback signal from the plurality of feedback signals. The flow data acquisition unit 400 proceeds to transfer the feedback signal to the PLC 500 so that the PLC 500 can proceed to adjust a pipeline pressure. More specifically, the PLC 500 adjusts the pipeline pressure by controlling the gas pressure regulator 403 of the gas flow section 444 while a gas flow control valve 407 of the gas flow section 444 is in a closed position. The pipeline pressure is adjusted to be marginally greater than the fluid mixture pressure value at the multiphase flow calibration unit 200 such that the one way gas valve 408 of the gas flow section 444 can operate/open.

When the pipeline pressure is marginally greater than the fluid mixture pressure value, the PLC 500 instructs the flow controller 600 to open the gas control valve to match a gas volumetric flow rate at the multiphase flow calibration unit 200, wherein the gas volumetric flow rate is determined from the desired fluid mixture flow rate. When the gas volumetric flow rate is achieved, the flow controller 600 sends a conclusion signal to the PLC 500, and the PLC 500 then proceeds to record a set of real time data from the water flow meter 107, the oil flow meter 108, the gas flow meter 406, a temperature sensor 113 from the multiphase flow calibration unit 200, a pressure sensor 114 from the multiphase flow calibration unit 200, a temperature sensor 404 from the gas flow section 444, and a pressure sensor 405 from the gas flow section 444. To do so, the flow data acquisition unit 400 is programmed to compute and display a set of real time data. The PLC 500 continues to simultaneously communicate with the flow data acquisition unit 400 and the flow controller 600 until the desired fluid mixture flow rate is achieved by the flow controller 600.

The process of monitoring and recording is reiterated by varying the desired fluid mixture flow rates of the multiphase flow meter. Upon completing the reiteration process, in order to calculate a calibration constant, the set of real time data is plotted against a set of fluid mixture flow rate data from the flow controller 600. More specifically, the set of fluid mixture flow rate data corresponds to the multiphase flow meter that is being calibrated. The process for calibrating the multiphase flow meter is replicated if a multiphase water meter is to be calibrated with the system of the present disclosure. The process for calibrating the multiphase flow meter is also replicated when determining a gas volume fraction of a multiphase fluid mixture.

As described earlier, the system of the present disclosure can be used for calibrating a two phase flow meter. When an oil-gas flow meter is being calibrated, the first water gate valve 103 and the second water gate valve 104 that are in fluid communication with the water flow meter 107 are in a closed position. On the other hand, the first oil gate valve 105 and the second oil gate valve 106 that are in fluid communication with the oil flow meter 108, and the gas gate valve 402 are in an open position. The multiphase solenoid valve 109 will be in an open position by the PLC 500 whereas the single phase solenoid valve 303 and the return single phase solenoid valve 304 will be in a closed position. The gas flow control valve 407 will also be in a closed position initially when the oil-gas flow meter is calibrated.

In order to perform the oil-gas flow meter calibration process, a desired fluid mixture flow rate is set using the flow controller 600 such that a volumetric flow for oil and gas is managed by the flow controller 600. Based upon the desired fluid mixture flow rate set by the flow controller 600, a volume of oil is drawn from the oil section 116 using the variable flow oil pump 102. The volume of oil, which corresponds to a calibration setting of the flow controller 600, is transferred through the multiphase flow calibration unit 200 where the oil-gas flow meter is integrated. When the volume of oil is passing through the multiphase flow calibration unit 200, a pressure sensor at the multiphase flow calibration unit 200 sends an oil pressure value to the PLC 500. Upon analyzing the oil pressure value, the PLC 500 controls the gas pressure regulator 403 to set a pipeline gas pressure value with the gas flow control valve 407 in a closed position. The pipeline gas pressure value is set to be marginally greater than the oil pressure value at the multiphase flow calibration unit 200 such that the one way gas valve 408 can be operated. If the pipeline gas pressure is obtained, the flow controller 600 sends a conclusion signal to the PLC 500 to manage the gas flow control valve 407. As a result, the flow controller 600 opens the gas flow control valve 407 until the desired fluid mixture is obtained at the multiphase flow calibration unit 200. When the desired fluid mixture is obtained, the flow data acquisition unit 400 is programmed to record a set of real time data using the gas flow meter 406, the pressure sensor 405 associated with the gas flow section 444, the pressure sensor 114 of the multiphase flow calibration unit 200, the temperature sensor 404 of the gas flow section 444, and the temperature sensor 113 of the multiphase flow calibration unit 200. The PLC 500 continues to simultaneously communicate with the flow data acquisition unit 400 and the flow controller 600 until the desired fluid mixture flow rate is achieved by the flow controller 600.

The process of monitoring and recording is reiterated by varying the desired fluid mixture flow rates of the oil-gas flow meter. Upon completing the reiteration process, in order to calculate a calibration constant, the set of real time data obtained from the flow data acquisition unit 400 is plotted against a set of fluid mixture flow rate data obtained for the oil-gas flow meter at the multiphase flow calibration unit 200. The process for calibrating the oil-gas flow meter is replicated if an oil-gas water meter is to be calibrated with the system of the present disclosure. The process for calibrating the oil-gas flow meter is also replicated when determining a gas volume fraction of an oil-gas fluid mixture.

When a water-gas flow meter is calibrated using the system of the present disclosure, a first oil gate valve 105 and a second oil gate valve 106 that are in fluid communication with the oil flow meter 108 are in a closed position. On the other hand, a first water gate valve 103 and a second water gate valve 104 that are in fluid communication with the water flow meter 107 are in an open position along with a gas gate valve 402 of the gas flow section 444. The multiphase solenoid valve 109 will be in an open position by the PLC 500 whereas the single phase solenoid valve 303 and the return single phase solenoid valve 304 will be in a closed position. The gas flow control valve 407 will also be in a closed position initially when the oil-gas flow meter is calibrated.

In order to perform the gas-water flow meter calibration process, a desired fluid mixture flow rate is set using the flow controller 600 such that a volumetric flow for gas and water are managed by the flow controller 600. Based upon the desired fluid mixture for the gas-water flow meter, a volume water is drawn from the water section 115 using the variable flow water pump 101. The volume of water, which corresponds to a calibration setting of the flow controller 600, is transferred through the multiphase flow calibration unit 200 where the gas-water flow meter is integrated.

When the flow controller 600 achieves a desired water flow rate, which is derived from the desired fluid mixture flow rate, the flow controller 600 sends a feedback signal to the PLC 500. A pressure sensor 114 at the multiphase flow calibration unit 200 also proceeds to send a water pressure value to the PLC 500. Based upon the water pressure value, the PLC 500 proceeds to adjust the gas pressure regulator 403 to a pipeline gas pressure value while the gas flow control valve 407 is in a closed position. The pipeline gas pressure value is set to be marginally greater than the water pressure such that the one way gas valve 408 can be operated. When the pipeline gas pressure is achieved, the PLC 500 instructs the flow controller 600 to operate the gas flow control valve 407 so that a desired volumetric gas flow rate is achieved at the multiphase flow calibration unit 200. Upon achieving the desired volumetric gas flow rate, the flow data acquisition unit 400 is programmed to record, compute, and display a set of real time data from the gas flow meter 406, the pressure sensor 114 at the multiphase flow calibration unit 200, the pressure sensor 405 of the gas flow section 444, the temperature sensor 113 at the multiphase flow calibration unit 200, and the temperature sensor 404 of the gas flow section 444. The PLC 500 continues to simultaneously communicate with the flow data acquisition unit 400 and the flow controller 600 until the desired fluid mixture flow rate is achieved by the flow controller 600.

The process of monitoring and recording is reiterated by varying the desired fluid mixture flow rates of the water-gas flow meter. Upon completing the reiteration process, in order to calculate a calibration constant, the set of real time data obtained from the flow data acquisition unit 400 is plotted against a set of fluid mixture flow rate data obtained for the water-gas flow meter at the multiphase flow calibration unit 200. The process for calibrating the water-gas flow meter is also replicated when determining a gas volume fraction of a water-gas fluid mixture.

When an oil-water flow meter is calibrated using the system of the present disclosure, a gas gate valve 402 of the gas flow section 444 is in a closed position. The first water gate valve 103 and the second water gate valve 104 that are in fluid communication with the water flow meter 107 are in an open position. Moreover, the first oil gate valve 105 and the second oil gate valve 106 that are in fluid communication with the oil flow meter 108 are in an open position. The multiphase solenoid valve 109 is an open position using the PLC 500, whereas the single phase solenoid valve 303 and the return single phase solenoid valve 304 are in a closed position.

In order to perform the oil-water flow meter calibration process, a desired fluid mixture flow rate is set using the flow controller 600 such that a volumetric flow for oil and water is managed by the flow controller 600. Based upon the desired fluid mixture flow rate set by the flow controller 600, a volume of oil is drawn from the oil section 116 using the variable flow oil pump 102. Likewise, based upon the desired fluid mixture flow rate set by the flow controller 600, a volume of water is drawn from the water section 115 using the variable flow oil pump 102.

When the flow controller 600 achieves the desired oil and water volumetric flow rates, the PLC 500 is notified such that the flow data acquisition unit 400 can record a set of real time data from the water flow meter 107, the oil flow meter 108, and the multiphase flow calibration unit 200 where the oil-water flow meter is integrated. The set of real time data obtained from the flow data acquisition unit 400 is plotted against a set of fluid mixture flow rate data obtained for the oil-water flow meter at the multiphase flow calibration unit 200, and the information derived from the set of real time data and the set of fluid mixture flow rate data are used for detailed analysis of different flow parameters. The process for calibrating the oil-water flow meter is replicated when calibrating an oil-water water cut meter as well.

As described earlier, the system of the present disclosure can also be used for calibrating a single phase oil flow meter. Before starting the calibration process for the single phase oil flow meter, the first water gate valve 103, the second water gate valve 104, and the gas gate valve 402 are kept in a closed position. The first oil gate valve 105 and the second oil gate valve 106 are kept in an open position. The multiphase solenoid valve 109 will be in an open position, whereas the single phase solenoid valve 303 and the return single phase solenoid valve 304 will be in a closed position. Moreover, the gas flow control valve 407 also remains in a closed position.

When calibrating the single phase oil flow meter, a desired oil flow rate is set for the single phase oil flow meter through the flow controller 600. In order to do so, a calibration option corresponding to the desired oil flow rate is selected from the flow controller 600. Based upon the desired oil flow rate, the variable oil flow pump draws a volume of oil from the oil section 116, and the volume of oil is transferred through the multiphase flow calibration unit 200 where the single phase oil flow meter is integrated.

When the flow controller 600 achieves the desired oil flow rate, a signal is sent to the PLC 500 such that the PLC 500 instructs the flow data acquisition unit 400 to record a set of real time data from the oil flow meter 108 and the multiphase flow calibration unit 200. The set of real time data is used for detailed analysis of the different flow parameters. The process of monitoring and recording the set of real time data is reiterated for different oil flow rates. By doing so, the set of real time data from the flow data acquisition unit 400 can be plotted against the set of oil flow rate data at the multiphase flow calibration unit 200 to determine a calibration constant.

The system of the present disclosure can also be used for calibrating a single phase water flow meter. Before starting the calibration process for the single phase water flow meter, the first oil gate valve 105, the second oil gate valve 106, and the gas gate valve 402 are in a closed position. Moreover, the single phase solenoid valve 303 and the return single phase solenoid valve 304 are in a closed position. The first water gate valve 103 and the second water gate valve 104, which are in fluid communication with the water flow meter 107, are in an open position along with the multiphase solenoid valve 109 which is also in an open position via the PLC 500. Before the calibration process is initiated, the gas flow control valve 407 also remains in a closed position.

When calibrating the single phase water flow meter, a desired water flow rate is set for the single phase water flow meter through the flow controller 600. In order to do so, a calibration option corresponding to the desired oil flow rate is selected from the flow controller 600. Based upon the desired water flow rate, the variable flow water pump 101, draws a volume of water from a water section 115, and the volume of water is transferred through the multiphase flow calibration unit 200 where the single phase water flow meter is integrated.

When the flow controller 600 achieves the desired water flow rate, a signal is sent to the PLC 500 such that the PLC 500 instructs the flow data acquisition unit 400 to record a set of real time data from the water flow meter 107 and the multiphase flow calibration unit 200. The set of real time data is used for detailed analysis of the different flow parameters. The process of monitoring and recording the set of real time data is reiterated for different water flow rates. By doing, the set of real time data from the flow data acquisition unit 400 can be plotted against the set of oil flow rate data at the multiphase flow calibration unit 200 to determine a calibration constant.

The system of the present disclosure can also be used for calibrating a single phase gas flow meter. Before starting the calibration process for the single phase gas flow meter, a first water gate valve 103, a second water gate valve 104, a first oil gate valve 105, and a second oil gate valve 106 are set to a closed position. The gas gate valve 402 is in an open position and the multiphase solenoid valve 109 is set to an open position using the PLC 500.

When calibrating the single phase gas flow meter, a desired gas flow rate and a gas pressure value is set for the single phase water flow meter through the flow controller 600. In order to do so, a calibration option corresponding to the desired gas flow rate is selected from the flow controller 600.

The pressure sensor at the multiphase flow calibration unit 200 sends a signal to the PLC 500 with the fluid mixture pressure value at the multiphase flow calibration unit 200. Based upon the fluid mixture pressure value, the PLC 500 adjusts the gas pressure regulator 403 to be set to a pipeline gas pressure. In doing so, the gas control valve is kept in a closed position. The pipeline gas pressure is selected to be marginally greater than the fluid mixture pressure value at the multiphase flow calibration unit 200 such that the one way gas valve 408 can be operated.

When the pipeline gas pressure is achieved, the PLC 500 instructs the flow controller 600 to operate the gas flow control valve 407. In particular, the flow control valve is left open until the desired gas flow rate is achieved at the multiphase flow calibration unit 200, wherein the single phase gas flow meter is integrated at the multiphase flow calibration unit 200. The flow data acquisition unit 400 is programmed to monitor, record, and display a set of real time data associated with the gas volumetric flow rate at an inlet of the multiphase flow calibration unit 200 by using the gas flow meter 406, the pressure sensor of the gas flow section 444, the pressure sensor at the multiphase flow calibration unit 200, the temperature sensor of the gas flow section 444, and the temperature sensor of the multiphase flow calibration unit 200. The PLC 500 continues to simultaneously communicate with the flow data acquisition unit 400 and the flow controller 600 until the desired flow rate at an inlet of the multiphase flow calibration unit 200 is achieved by the flow controller 600.

When the flow controller 600 achieves the desired gas flow rate, a signal is sent to the PLC 500 such that the PLC 500 instructs the flow data acquisition unit 400 to record a set of real time data from the gas flow meter 406, the pressure sensor of the gas flow section 444, the pressure sensor at the multiphase flow calibration unit 200, the temperature sensor of the gas flow section 444, the temperature sensor of the multiphase flow calibration unit 200, and the multiphase flow calibration unit 200 where the single phase gas flow meter is integrated. The set of real time data is used for detailed analysis of the different flow parameters. The process of monitoring and recording the set of real time data is reiterated for different gas flow rates. By doing, the set of real time data from the data acquisition can be plotted against the set of gas flow rate data at the multiphase flow calibration unit 200 to determine a calibration constant.

When determining the calibration constant of the water flow meter 107 in the system of the present disclosure, a water volume flow rate, $V_w$, for a fixed flow rate of the variable flow water pump 101 is obtained from the following:

$$V_w = \frac{\Delta h_w A}{\Delta t} \quad (1)$$

Where, $$\Delta h = h_{2w} - h_{1w}$$

$V_w$=Water volume flow rate for a fixed pump flow rate, cubic meters/second (m$^3$/s);
$\Delta h_w$=rise in water levels (in meters) in the calibration tank during the time interval $\Delta t=(t_2-t_1)$ (secs);
A=Cross-sectional area of the calibration square tank, m$^2$;
For different flow rates of the variable flow water pump 101, the actual volume flow rate can be obtained from equation 1.
The measured water volume flow rates obtained by varying the flow rate of the variable flow water pump 101 is compared with the data obtained from the water flow meter 107. The calibration constant can be determined by plotting the water flow meter 107 data versus the measured water flow rates.

The calculation steps used for the calibration constant water flow meter 107 of the system is replicated when calculating the calibration constant of the oil flow meter 108. The oil volume flow rate, $V_o$, for the variable flow oil pump 102 can be obtained by the following:

$$V_o = \frac{\Delta h_o A}{\Delta t} \qquad (2)$$

Where, $$\Delta h_o = h_{2o} - h_{1o}$$

$V_o$=Oil volume flow rate for a fixed pump flow rate, m³/s;
$\Delta h_o$=Rise in oil level (in meters) in the single phase calibration tank 300 during the time interval $\Delta t$ ($t_2-t_1$) (secs);
A=Cross-sectional area of the single phase calibration tank 300, m²;

For different flow rates of the variable flow oil pump 102, the actual volume flow rate can be obtained from equation 2.

The measured oil volume flow rates obtained by varying the flow rate of the variable flow oil pump 102 is compared with the data obtained from the oil flow meter 108. The calibration constant can be determined by plotting the oil flow meter 108 data versus the measured oil flow rates.

As described earlier, a factory calibrated gas flow meter will be utilized. The gas flow meter 406 utilized in the system can be, but is not limited to, a laminar differential pressure (DP) based flow meter, a thermal flow meter, a Coriolis flow meter, an ultrasonic flow meter, or a variable area flow meter.

When determining the multiphase flow meter or multiphase water cut meter calibration constant, a gas volume flow rate is measured at the multiphase flow calibration unit 200, wherein the multiphase flow meter or the multiphase water cut meter is integrated into the multiphase flow calibration unit 200. The distance between the gas flow meter 406 and the multiphase flow calibration unit 200 is the main reason for measuring the gas volume flow rate at the multiphase flow calibration unit 200. Due to the difference in pressure and temperature at the gas flow section 444 and an inlet of the multiphase flow calibration unit 200, the gas volume flow rate at the multiphase flow calibration unit 200 will vary depending on the conditions of the multiphase flow calibration unit 200 inlet.

The gas volume flow rate at the multiphase flow calibration unit 200 is computed automatically by the flow data acquisition unit 400 from the real time data acquired from the gas flow meter 406, temperature sensor of the multiphase flow calibration unit 200, temperature sensor of the gas flow section 444, the pressure sensor at the multiphase flow calibration unit 200, and the pressure sensor at the gas flow section 444.

The gas volume flow rate at an inlet of multiphase flow calibration unit 200 is computed from the following equation using the constant mass flow rate principle:

$$V_g = \frac{p_m \cdot T_g}{p_g T_m} V_m \qquad (3)$$

Where,
$V_g$=Gas volume flow rate at the inlet of the multiphase flow calibration unit 200, m³/s;
$V_m$=Gas volume flow rate at the gas flow meter 406 location, m³/s;
$P_g$=Absolute multiphase fluid mixture pressure at the inlet of the multiphase flow calibration unit 200, Pascal (Pa);
$P_m$=Absolute gas pressure at the gas flow section 444, Pa;
$T_g$=Multiphase fluid mixture temperature at the multiphase flow calibration unit 200, Kelvin (K);
$T_m$=Gas temperature at the gas flow section 444, K.

The system of the present disclosure can also be used for water cut measurement and calculating the calibration constant of the water cut meter. The water cut, represented by $\lambda$, is the volume fraction of water in a fluid mixture containing oil, gas, and water. For homogenous flow, and fixed flow rate flow pumps such as the variable flow water pump 101 and the variable flow oil pump 102, the following equation can be used for the water cut:

$$\lambda = \frac{V_w}{V_w + V_o + V_g} \qquad (4)$$

Where,
$\lambda$=water-cut;
$V_w$=water volume flow rate from water flow meter 107, m³/s;
$V_o$=oil volume flow rate from oil flow meter 108, m³/s;
$V_g$=calculated gas volume flow rate at the inlet of the multiphase flow calibration unit 200, m³/s.

The water cut, $\lambda$, for two phase flows such as oil-water and water-gas, using the appropriate volumetric flow rate terms can be obtained from equation 4.

The data from the water flow meter 107 and the oil flow meter 108 that are pre calibrated are used to calculate the water cuts for different flow rates of the variable flow water pump 101 and the variable flow oil pump 102. The gas volume flow rate at the multiphase flow calibration unit 200 is computed from the data obtained from the gas flow meter 406, the temperature sensor of the multiphase flow calibration unit 200, the temperature sensor at the gas flow section 444, the pressure sensor at the multiphase flow calibration unit 200, and the pressure sensor at the gas flow section 444 since the gas volumetric flow rate depends on the pressure and temperature in the flow loop pipeline.

The data obtained for the water cut meter, wherein the data was measured by varying the flow rates of the variable flow water pump 101 and the variable flow oil pump 102 and by injecting gas into the piping system 445 at the defined liquid mixture for oil-water pressure, is compared with the data obtained from the water cut meter. Plotting the measured water cut meter data against the data from the water cut meter data helps determine the calibration constant for the water cut meter.

When the system of the present disclosure is used to measure the multiphase fluid flow rate and find a calibration constant for the multiphase flow meter, the multiphase fluid flow rate is determined directly from the water flow meter 107 and the oil flow meter 108 that are pre-calibrated and the gas volume flow rate which was calculated for the multiphase flow calibration unit 200. The multiphase fluid volume flow rate can be calculated from the following:

$$V_m = +V_w + V_o + V_g \qquad (5)$$

Where, $V_m$=Multiphase fluid mixture flow rate, m³/s;
$V_w$=Water volume flow rate from water flow meter 107, m³/s;
$V_o$=Oil volume flow rate from oil flow meter 108, m³/s;
$V_g$=Calculated gas volume flow rate at the inlet of the multiphase flow calibration unit 200, m³/s;

The multiphase mixture fluid volume flow rate for two phase flows, such as oil-water, water-gas, and gas-oil, using the appropriate volumetric flow rate terms can be obtained from equation 5.

The gas volume fraction (GVF), which is the ratio of gas volumetric flow rate to the total fluid mixture (oil-gas-water) flow rate, is obtained from the following relation:

$$GVF = \frac{V_g}{V_w + V_o + V_g} \tag{6}$$

The gas volume fraction (GVF) for two phase flows, such as oil-water, water-gas, and gas-oil, using the appropriate volumetric flow rate terms, can be obtained from equation 6.

The data from the water flow meter 107 that is pre-calibrated and the data from the oil flow meter 108 that is pre-calibrated are used directly for different flow rates of the variable flow water pump 101 and the variable flow oil pump 102. The gas volume flow rate at the inlet of the multiphase flow calibration unit 200 is computed from the data obtained from the gas flow meter 406, temperature sensor of the multiphase flow calibration unit 200, temperature sensor of the gas flow section 444, the pressure sensor of the multiphase flow calibration unit 200, and the pressure sensor of the gas flow section 444. The flow data acquisition unit 400 is programmed to obtain the gas volume flow rate at the inlet of the multiphase flow calibration unit 200 by using the measured data from the gas flow meter 406, temperature sensor of the multiphase flow calibration unit 200, temperature sensor of the gas flow section 444, the pressure sensor of the multiphase flow calibration unit 200, and the pressure sensor of the gas flow section 444.

The multiphase fluid mixture flow rate data that was obtained by varying the flow rate of the variable flow oil pump 102 and the variable flow water pump 101 and by injecting different quantities of the gas is compared with the data obtained from the multiphase flow meter. The calibration constant can be calculated by plotting the data from the multiphase flow meter versus the multiphase fluid flow rate data that was measured.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

Obviously, numerous modifications and variations of the present invention are possible in light of the above teachings. It is therefore to be understood that within the scope of the appended claims, the invention may be practiced otherwise than as specifically described herein.

The invention claimed is:

1. A multiphase flow meter calibration system, comprising:
   an oil-gas-water separation unit, wherein the oil-gas-water separation unit is a cylindrical vertical tank comprising a fluid separation weir;
   a multiphase fluid inlet, wherein a multiphase fluid mixture flows into the oil-gas-water separation unit through the multiphase fluid inlet;
   a single phase water outlet, wherein the single phase water outlet is in fluid communication with a water section of the oil-gas-water separation unit through a variable flow water pump and a water flow meter;
   a single phase oil outlet, wherein the single phase oil outlet is in fluid communication with an oil section of the oil-gas-water separation unit with a variable flow oil pump and an oil flow meter;
   a phase combination piping joint, wherein the single phase water outlet and the single phase oil outlet are in fluid communication with the phase combination piping joint;
   a gas flow outlet, wherein the gas flow outlet is in fluid communication with a pressurized gas tank through a gas pressure regulator and a gas flow meter;
   the gas flow outlet being in fluid communication with the phase combination piping joint;
   a downstream homogenizer, wherein the downstream homogenizer comprises a homogenizer inlet and a homogenizer outlet;
   a piping outlet of the phase combination piping joint being in fluid communication with the homogenizer inlet;
   the homogenizer outlet being in fluid communication with an inlet of a multiphase flow calibration unit; and
   the multiphase flow calibration unit being in fluid communication with the oil-gas-water separation unit.

2. The multiphase flow meter calibration system as of claim 1 further comprising:
   a first oil gate valve;
   a second oil gate valve;
   a one way oil valve;
   the oil section being in fluid communication with the variable flow oil pump through the first oil gate valve, and
   the variable flow oil pump being in fluid communication with the one way oil valve through the oil flow meter and the second oil gate valve.

3. The multiphase flow meter calibration system as of claim 1, wherein a gas flow section comprises a gas gate valve, at least one temperature sensor, at least one pressure sensor, a gas flow control valve, and a one way gas valve;
   the pressurized gas tank, the gas gate valve, the gas pressure regulator, the gas flow meter, the gas flow control valve, and the one way gas valve being in fluid communication with each other; and
   the at least one temperature sensor and the at least one pressure sensor being operatively coupled with a gas line extending from the pressurized gas tank.

4. The multiphase flow meter calibration system as of claim 1 further comprising:
a flow data acquisition unit;
a programmable logic controller (PLC), wherein the PLC is communicably coupled with the flow data acquisition unit;
wherein the water flow meter, the oil flow meter, and the gas flow meter are communicably coupled with the flow data acquisition unit; and
wherein the PLC is operatively coupled with the variable flow water pump, the variable flow oil pump, and the gas pressure regulator.

5. The multiphase flow meter calibration system as of claim 4, wherein the data acquisition system is a microprocessor based flow data acquisition unit.

6. The multiphase flow meter calibration system as of claim 1 further comprising:
a flow controller;
the water flow meter and the oil flow meter being communicably coupled with the flow controller;
the gas flow meter being communicably coupled with the flow controller;
the flow controller being operatively coupled with a variable flow water pump, and a variable flow oil pump; and
the flow controller being operatively coupled with the gas flow control valve.

7. The multiphase flow meter calibration system as of claim 1, wherein a single phase flow calibration section comprises a single phase calibration tank, a fluid level sensor, a drain gate valve, a single phase solenoid valve, a return single phase solenoid valve, a return fluid pump, a fluid level sighting glass, an air vent, and a removable lid;
the fluid level sensor being positioned within the single phase calibration tank;
the removable lid being removably attached to the single phase calibration tank;
the fluid level sighting glass extending outwards from the single phase calibration tank;
the air vent traversing through the removable lid;
the multiphase flow calibration unit being in fluid communication with the single phase calibration tank through the single phase solenoid valve;
the drain gate valve being in fluid communication with the single phase calibration tank;
the single phase calibration tank being in fluid communication with the return fluid pump through the return single phase solenoid valve; and
the return fluid pump being in fluid communication with a water section of the oil-gas-water separation unit.

8. The multiphase flow meter calibration system as of claim 1 further comprising:
a multiphase solenoid valve; and
the multiphase flow calibration unit being in fluid communication with the oil-gas-water separation unit through the multiphase solenoid valve.

* * * * *